Nov. 6, 1962 R. N. FALGE 3,062,951
VEHICLE HEADLAMP SYSTEM
Filed Jan. 16, 1956 3 Sheets-Sheet 1

INVENTOR.
Robert N. Falge
BY E. W. Christen
ATTORNEY

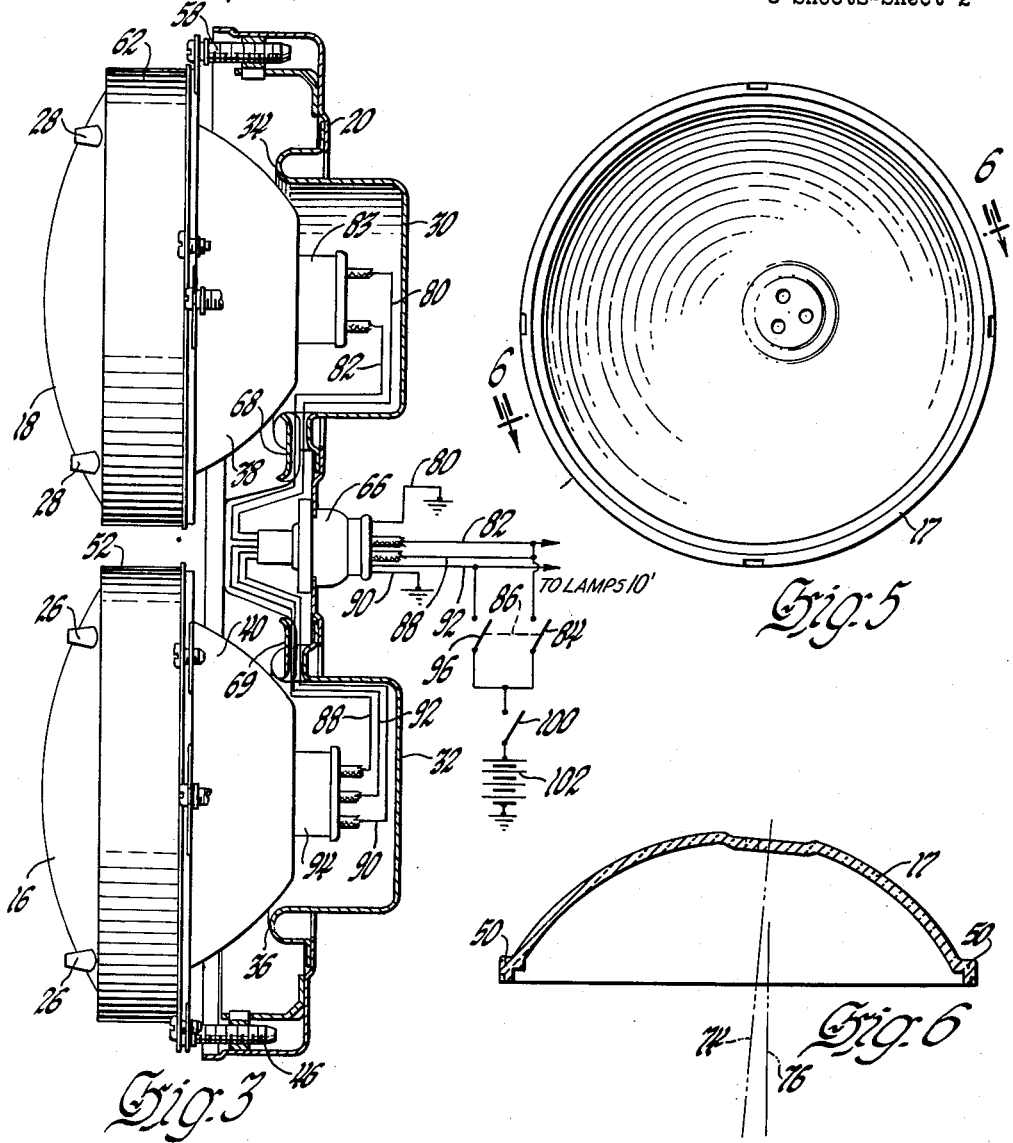
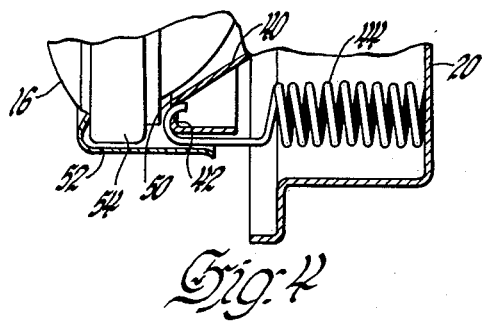

United States Patent Office 3,062,951
Patented Nov. 6, 1962

3,062,951
VEHICLE HEADLAMP SYSTEM
Robert N. Falge, Anderson, Ind., assignor to General Motors Corporation, Detroit, Mich., a corporation of Delaware
Filed Jan. 16, 1956, Ser. No. 559,341
2 Claims. (Cl. 240—7.1)

This invention relates to vehicle headlamp systems and more particularly to such systems which provide plural light beams which may be selectively energized in accordance with different operating conditions.

In the present-day vehicle lighting systems, it is a common practice to provide roadway illumination by a pair of selectable light beams known as the upper and lower beams. The upper beam, also commonly referred to as the country driving beam, provides roadway illumination far in advance of the vehicle and is usually directed straight-ahead or parallel to the longitudinal axis of the vehicle. The upper beam light distribution pattern preferably comprises a widespread field of body light of relatively low intensity and a superposed concentrated field of hot spot light of relatively high intensity. The hot spot light provides illumination at great distances within a relatively small angle and the body light provides illumination at lesser distance within a relatively wide angle including the shoulders or berms of the roadway. The light distribution of the lower beam, sometimes referred to as the city driving or passing beam, comprises body light and hot spot light which is preferably directed somewhat below a horizontal plane and to the right of the straight-ahead direction of the vehicle.

Heretofore, the commercially accepted headlamp systems have employed a pair of lamps each having two filaments which are selectively energized to provide upper and lower beams. In such systems, the upper beam is produced by a filament located at the focal point of each lamp reflector and the lower beam is produced by a filament located at an off focal point position. This relationship enables good control of the directivity and distribution of the upper beam; however, the off focal point position of the lower beam filament is disadvantageous in respect to control of directivity and distribution of the lower beams.

In this prior arrangement, the upper and lower beams cannot be aimed independently since a common reflector and lens is employed. Therefore, the usual practice has been to aim only the upper beam. This results in an improperly aimed lower beam because of production variations in placement of the filaments with respect to each other.

In the use of a two filament lamp for providing both upper and lower beams, it has been a common practice to use light bending prisms in the lens to impart the desired directional control to the light beams. In the use of down-bending prisms, for example, to control the lower beam, the draft angles of the prisms are known to produce glare or uncontrolled light which impairs the vision of the operator of an oncoming vehicle and reduces the efficiency of the lamp.

Furthermore, in the use of a pair of two filament lamps for providing upper and lower beams, the control of candlepower and glare, as prescribed by recognized standards and some legislative enactments, has not been realized in the conventional headlamp systems.

Accordingly, it is an object of this invention to provide an improved vehicle headlamp system affording superior control of light beam direction and distribution for both the upper and lower beams.

An additional object of the invention is to provide a vehicle headlamp system which permits independent aiming of both upper and lower beams.

A further object of the invention is to provide a vehicle headlamp system permitting lamp design which affords a higher degree of light control and greater lamp efficiency.

An additional object of the invention is to provide a vehicle headlamp system permitting operation at high candlepower and providing for improved definition of the light beam distribution pattern.

In the accomplishment of these objects there is provided a headlamp system utilizing a complementary pair of projection lamps and preferably the system employs two such complementary pairs. One of the lamps of each pair has a lower beam light source or filament located with one end substantially at the focal point of the lamp reflector and an upper beam filament located at a position below the focal point of the reflector. The reflector of this lamp is preferably tilted with respect to its mounting surface to impart the desired directivity to the lower beam. The other lamp of each pair has an upper beam filament located at the focal point of the lamp reflector to augment the upper beam illumination from the first lamp.

A more complete understatnding of the invention may be had from the detailed description which follows taken with the accompanying drawings in which:

FIGURE 3 is a sectional view taken on lines 3—3 of FIGURE 2;

FIGURE 4 is a fragmentary view taken on lines 4—4 of FIGURE 2;

FIGURE 5 is a front view of the reflector of one of the projection lamps;

FIGURE 6 is a sectional view taken on lines 6—6 of FIGURE 5;

Figure 1:
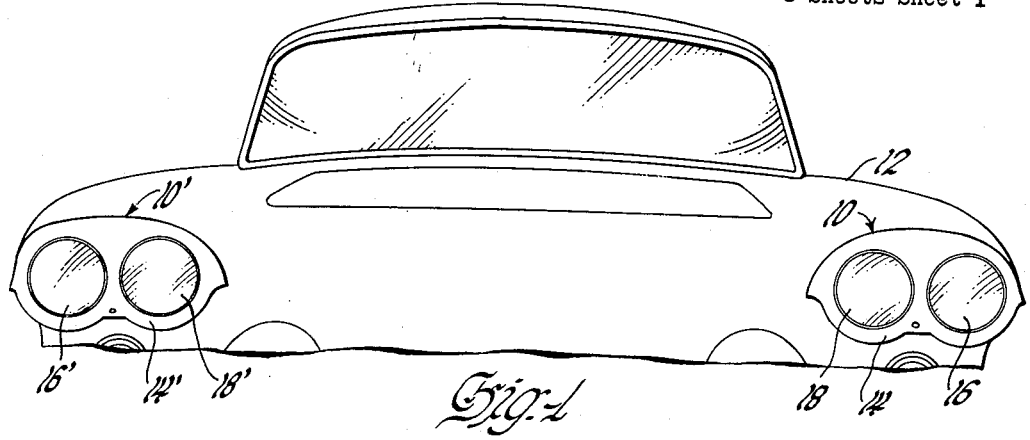
FIGURE 1 is a front view of the inventive headlamp system installed on an automotive vehicle.

Referring now to the drawings, there is shown an illustrative embodiment of the invention in a vehicle headlamp system having two complementary pairs of lamps. As shown in FIGURE 1, the system comprises a pair of projection lamps, designated generally at 10, and an identical pair of headlamps 10' which are mounted in a forward panel of the vehicle body 12. In the illustrative embodiment, the two pairs of projection lamps are installed in a symmetrical, oppositely disposed arrangement on the vehicle body. Upon vehicle installation, each complementary pair of lamps 10 and 10' is partially concealed by the lamp bezels or doors 14 and 14', leaving only the lenses of the lamps 16 and 18 and the lenses of the lamps 16' and 18' exposed to view.

The two complementary pairs of lamps 10 and 10' are the same in structure and arrangement in that the inboard lamps of both pairs are identical and the outboard lamps of each pair are identical. Therefore, a description of the structural details will be given with reference to the pair of lamps 10 which is shown in FIGURES 1 through 6.

The pair of complementary lamps 10 includes an outboard projection lamp 16 and an inboard projection lamp 18. Both lamps are dirigibly mounted in a single housing or casing 20. Each of the projection lamps is preferably of the well known all glass sealed beam construction and suitably may be of the pre-aimed type. Accordingly, the lens 22 of the lamp 16 is provided with aiming bosses 26 and the lamp 18 is provided with aiming bosses 28. The pre-aimed projection lamp is disclosed and claimed in a co-pending application S.N. 515,684 for "Pre-Aimed Light Projector," by Charles F. Arnold and Edward N. Cole, filed June 15, 1955, now Patent No. 2,870,362, issued January 20, 1959.

The mounting structure for the lamps 16 and 18 comprises an elongated casing 20 preferably of stamped sheet metal construction and having a pair of cup-shaped portions 30 and 32 formed with annular seating surfaces 34 and 36, respectively. A pair of identical mounting members or rings 38 and 40, of bowl shape configuration, are disposed against the annular seating surfaces 34 and 36, respectively. As shown in FIGURE 4, the mounting ring 40 terminates in an annular seating shoulder 42 and is secured at its periphery by a coil spring 44 to the casing 20. The mounting ring is secured at a point on its horizontal diameter to the casing 20 by a horizontal adjusting screw 46. The mounting ring is secured at a point on the vertical diameter to the casing 20 by a vertical adjusting screw 48. The lamp 16 is provided with a mounting surface 50 which is seated against the annular mounting surface 42 of the mounting ring 40. A retaining ring 52 is provided with an inturned annular flange which engages the mounting flange 54 of the lamp 16 to secure the lamp in position with respect to the mounting ring 40. The retaining ring is secured to the mounting ring by a plurality of screw threaded fasteners 56. Similarly, the mounting ring 38 is seated against the annular mounting surface 34 and secured to the casing 20 by a coil spring 57, a horizontal adjusting screw 58, and a vertical adjusting screw 60. The lamp 18 is seated in the mounting ring 38 and retained in place by a retaining ring 62 which is secured to the mounting ring by plural screw threaded fasteners 64. The casing 20 is provided with a central opening intermediate the cup-shaped portions 30 and 32 and supports a grommet 66 which accommodates the electrical conductors for energizing the lamps. On opposite sides of the grommet 66, interior of the casing 20, are retaining members 68 and 69 for securing the conductors in position. The electrical circuit for energizing the lamps will be described subsequently.

The lamps 16 and 18 are both constructed with parabolic reflectors 17 and 19, respectively, for imparting directional control to the light rays emanating from the enclosed source. The reflector construction will be described further hereinafter with the description of the individual lamps 16 and 18. The lamps 16 and 18 are provided with lenses 22 and 24, respectively, for imparting desired distributional control to the light beam, in a well known manner. The exact design of the lenses 22 and 24 forms no part of the present invention and accordingly details thereof are omitted. Each lens may be of that general type presently employed in commercially available headlamps which produces a light beam distribution pattern including a field of body light and a superposed field of hot spot light. A variety of specific lens designs for providing such distribution and suitable for use with the present invention are well known to those skilled in the art. In general, such lenses are formed with a plurality of optical elements or flutes suitably disposed in an array of vertical columns and horizontal rows. Each flute is adapted to refract the transmitted light a desired amount to obtain suitable horizontal and vertical spread. The flutes may be provided with suitable prism angles to impart a desired change of direction to the transmitted light. In some specific lens designs those flutes which transmit light forming a particular part of the beam pattern may be grouped into one or more sections. For example, the flute sections for producing the hot spot light may be located near the center of the lens and those sections for producing the body light may be located in the upper and lower portions of the lens. A lens of this general type is disclosed in U.S. Patent 2,137,079 for "Lens" issued to Robert N. Falge and assigned to the assignee of the present invention.

Figure 2:
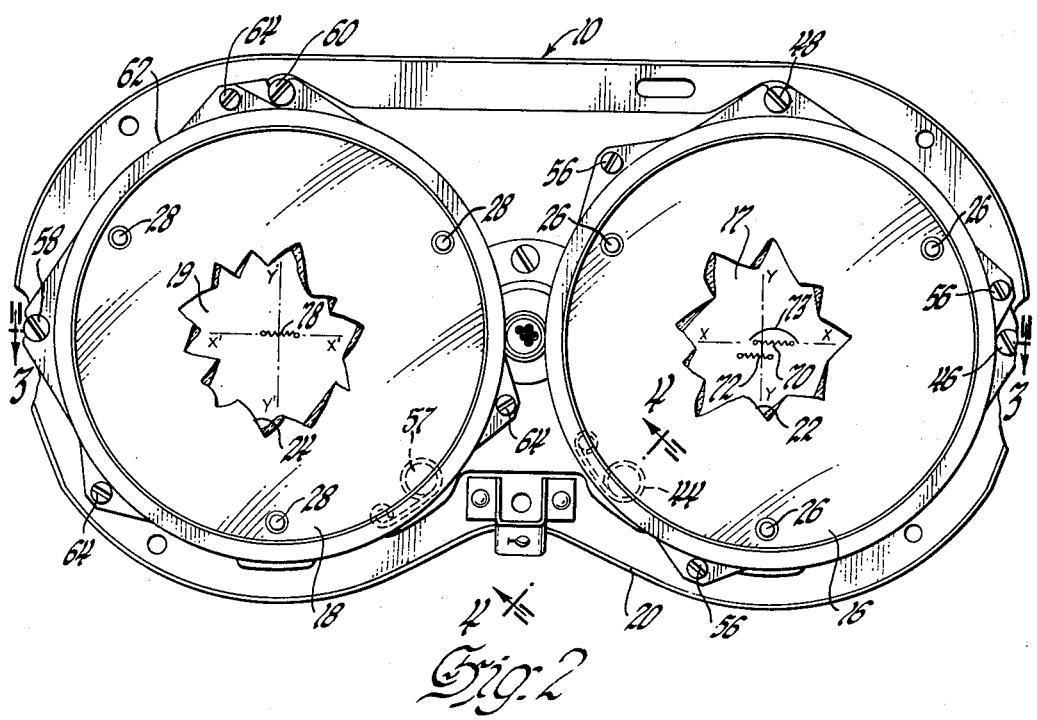
FIGURE 2 is a front view of a complementary pair of projection lamps.

As shown in FIGURE 2, the lamp 16 is provided with a lower beam light source or filament 70 located with one end approximately at the reflector focal point which is represented by the intersection of the axis $x$—$x$ and the axis $y$—$y$. Preferably, and as shown in FIGURE 2, the center of filament 70 is displaced to the left when viewed in the direction of the projected light beam (to the right as viewed in FIGURE 2) an amount which is substantially one-half the length of the filament. The reason for this lateral shift of the filament 70 will become apparent subsequently from a consideration of the light beam pattern. The projection lamp 16 is also provided with an upper beam filament 72 which is located somewhat below the focal point of the reflector and may be approximately centered thereon or shifted somewhat in its lateral position. A filament shield 73 is disposed adjacent the lower beam filament 70.

In order to impart the desired directivity to the lower beam from lamp 16, the reflector 17, as shown in FIGURES 5 and 6, is constructed with the parabola axis 74 angularly displaced from the line 76 normal to the plane of the mounting surfaces 50 of the lamp 16. This angular displacement of the parabola axis is preferably down and to the right when viewed in the direction of the projected light beam. The amount of angular displacement, expressed with reference to the horizontal and vertical planes, is preferably in the range of two degrees down and three degrees right.

The lamp 18 is provided with an upper beam filament 78 located approximately at the focal point of the reflector 19. The focal point is represented by the intersection of the axes $x'$—$x'$ and $y'$—$y'$. The parabola axis of the reflector 19 is preferably normal to the plane of the mounting surfaces of the lamp 18.

In FIGURE 3, circuit means are illustrated for energizing the filaments of the lamps 16 or 18. The upper beam filament 78 of the lamp 18 is connected in series circuit with the conductors 80 and 82 which extend from the socket 83 through the retaining device 68 and through the grommet 66 to the exterior of casing 20. The conductor 80 is connected to ground and the conductor 82 is connected with the contacts 84 of a beam control switch 86, suitably of the ratchet type. The upper beam filament 72 in lamp 16 is connected in series circuit with the conductor 90 which is connected to ground and the conductor 88 which is connected to the contacts 84 of switch 86. The contacts 84 of switch 86 are connected through the headlamp switch 100 to one terminal of battery 102. The other terminal of the battery is connected to ground. Therefore, when the switch 100 and contacts 84 are closed, the upper beam filaments 72 and 78 are energized simultaneously. The lower beam filament 70 is connected in series circuit with grounded conductor 90 and conductor 92 which is connected to the contacts 96 of beam control switch 86. The contacts 96 are connected with headlamp switch 100 and accordingly, when both are closed, the lower beam filament 70 in lamp 16 is energized.

The performance of the inventive system is best illustrated by a consideration of the resultant beam patterns. With the two complementary pairs of lamps 10 and 10' installed on the vehicle, aiming of each lamp is accomplished by manipulation of the horizontal adjusting screws 46 and 58 and the vertical adjusting screws 48 and 60, in a well known manner. The angular position of lamps 16 and 16' is adjusted to obtain the desired directivity of the lower beam thereof. The angular position of the lamps 18 and 18' is adjusted to obtain the desired directivity of the upper beam transmitted thereby. With lamps of the pre-aimed type, precise aiming is obtained by a geometrical aiming instrument seated against the aiming surface defined by aiming bosses 26 on lamp 16 and aiming bosses 28 on lamp 18. With the lamps properly aimed and the vehicle in a level attitude, the beam patterns with reference to the horizontal plane represented by axis $a$—$a$ and the vertical plane represented by axis $b$—$b$ are illustrated in FIGURES 7, 8, 9 and 10. The horizontal plane corresponds approximately to the horizontal plane through the focal points of the lamps and the vertical plane corresponds approximately to the vertical plane through the longitudinal axis of the vehicle.

Figure 7:
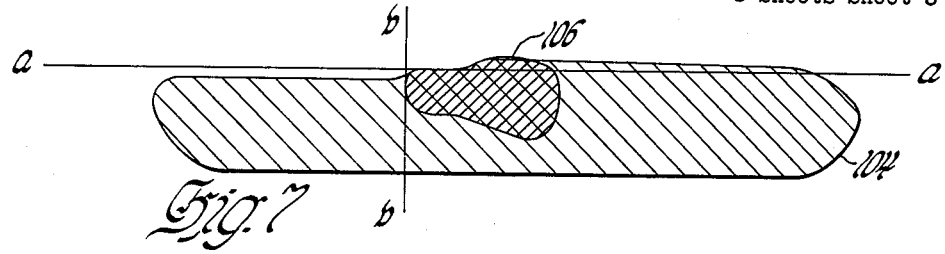
FIGURE 7 illustrates the lower beam light distribution pattern produced by one of the projection lamps.

When the lower beam filaments 70 of the lamps are energized, the beam pattern distribution is that shown in FIGURE 7. It comprises a field of widespread body light 104 which is of relatively low intensity and a concentrated field of hot spot light 106 which is of relatively high intensity. It is noted that the beam pattern distribution is such that the horizontal cut-off to the left of the vertical axis b—b is somewhat below the horizontal axis a—a. The hot spot light 106, for a substantial distance to the right of the vertical axis, has a horizontal cut-off coincident with the horizontal axis. The hot spot light pattern is somewhat ovoid in shape as a result of the lateral shift of the lower beam filament 70 as previously described. This permits the accurate positioning of the most intense portion of the hot spot light in the lower right hand quadrant of the axes a—a and b—b.

Figure 8:
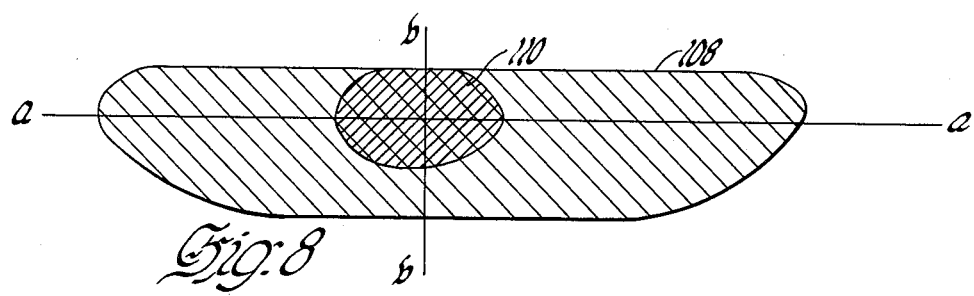
FIGURE 8 illustrates the upper beam light distribution pattern produced by the same lamp as that of FIGURE 7.
Figure 9:
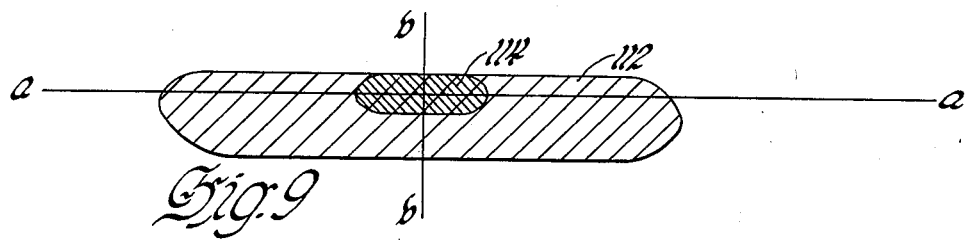
FIGURE 9 illustrates the upper beam light distribution pattern produced by the other projection lamp.
Figure 10:
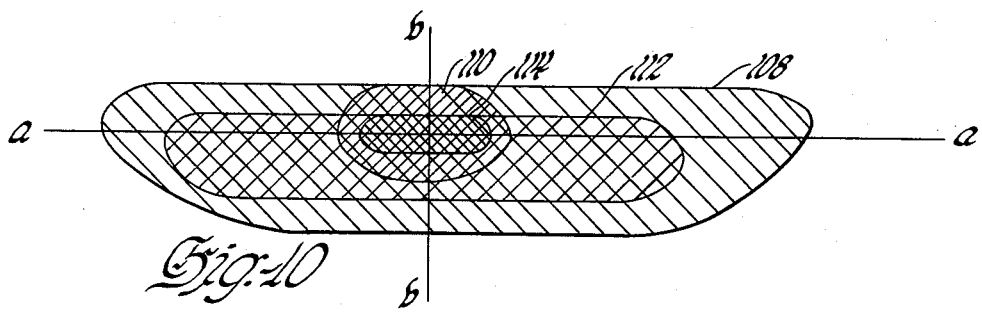
FIGURE 10 illustrates the composite upper beam distribution pattern obtained from both of the projection lamps.

In FIGURE 8 is illustrated the upper beam pattern produced by the upper beam filaments 72 of lamps 16. It comprises a widespread field of body light 108 and a hot spot portion 110 which are substantially symmetrical with respect to the axes a—a and b—b. Due to the fact that the upper beam filament 72 is located off the focal point of the reflector 17, the beam produced thereby is somewhat deficient in and around the hot spot 110. In FIGURE 9 is illustrated the light beam distribution pattern produced by the upper beam filament 78 of lamps 18. It comprises body light 112 and hot spot light 114. The filament 78 is located at the focal point of reflector 19 and accordingly, good control of the upper beam hot spot light and body light is achieved. The two upper beam patterns of FIGURES 8 and 9 are, of course, superposed and the resulting light beam distribution pattern is shown in FIGURE 10. It is noted that the well defined hot spot area 114 is substantially symmetrical with respect to the axes a—a and b—b.

Although the description of this invention has been given with respect to a particular embodiment, it is not to be construed in a limiting sense. Many modifications and variations within the spirit and scope of the invention will now occur to those skilled in the art. For a definition of the invention, reference is made to the appended claims.

I claim:
1. A vehicle headlamp system comprising first and second pairs of projection lamps, each lamp including a mounting surface, a parabolic reflector, and a lens, each of the first pair of lamps having a lower beam filament at the focal point of the reflector and an upper beam filament below the focal point, the parabola axis of each of the first pair of lamps being directed down and to the right of a line normal to the mounting surface, a filament shield disposed above the lower beam filament in each of the first pair of lamps, each of the second pair of lamps having an upper beam filament at the focal point of the reflector, the parabola axis of each of the second pair of lamps being normal to the mounting surface, and circuit means for simultaneously energizing the upper beam filaments in both pairs of lamps, and for simultaneously energizing the lower beam filaments in the first pair of lamps.

2. In an automotive vehicle, a headlamp system comprising first and second pairs of projection lamps, the pairs being disposed oppositely in a forward panel of the vehicle body, each lamp being secured in a dirigible mounting structure including a mounting surface, a parabolic reflector, and a lens, one lamp of each pair having the parabola axis directed down and to the right of a line normal to the mounting surface and having a lower beam filament at the focal point of the reflector and an upper beam filament below the focal point, the other lamp of each pair having the parabola axis directed normal to the mounting surface and an upper beam filament located at the focal point of the reflector, and circuit means for simultaneously energizing the upper beam filaments in both pairs of lamps, and for simultaneously energizing the lower beam filaments in both pairs of lamps.

References Cited in the file of this patent

UNITED STATES PATENTS

| | | |
|---|---|---|
| 1,448,637 | Montague | Mar. 13, 1923 |
| 1,578,920 | Robinson | Mar. 30, 1926 |
| 2,131,634 | Michel et al. | Sept. 27, 1938 |
| 2,170,682 | Frech et al. | Aug. 22, 1939 |
| 2,253,615 | Falge et al. | Aug. 26, 1941 |
| 2,266,329 | Mead et al. | Dec. 16, 1941 |

FOREIGN PATENTS

| | | |
|---|---|---|
| 320,670 | Great Britain | Oct. 21, 1929 |